United States Patent
Ahn et al.

(10) Patent No.: US 11,210,147 B2
(45) Date of Patent: Dec. 28, 2021

(54) ELECTRONIC DEVICE FOR PERFORMING APPLICATION-RELATED INTEROPERATION, AND METHOD THEREFOR

(71) Applicant: SAMSUNG ELECTRONICS CO., LTD., Suwon-si (KR)

(72) Inventors: Jin-Hyeong Ahn, Suncheon-si (KR); Yong-jin Kim, Seoul (KR); Ji-won Kim, Suwon-si (KR); Kyung-ah Chang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/073,981

(22) PCT Filed: Feb. 3, 2017

(86) PCT No.: PCT/KR2017/001231
§ 371 (c)(1),
(2) Date: Jul. 30, 2018

(87) PCT Pub. No.: WO2017/135764
PCT Pub. Date: Aug. 10, 2017

(65) Prior Publication Data
US 2019/0042338 A1    Feb. 7, 2019

(30) Foreign Application Priority Data

Feb. 3, 2016 (KR) .................. 10-2016-0013446
Feb. 2, 2017 (KR) .................. 10-2017-0015157

(51) Int. Cl.
*G06F 13/10* (2006.01)
*G06F 9/54* (2006.01)
(Continued)

(52) U.S. Cl.
CPC .............. *G06F 9/546* (2013.01); *G06F 13/38* (2013.01); *H04L 63/083* (2013.01); *H04L 67/02* (2013.01); *H04L 67/16* (2013.01); *H04W 12/06* (2013.01)

(58) Field of Classification Search
CPC ....... G06F 9/546; G06F 13/38; H04L 63/083; H04L 67/02; H04L 67/16; H04W 12/06
See application file for complete search history.

(56) References Cited

U.S. PATENT DOCUMENTS

2007/0213094 A1    9/2007  Kane et al.
2013/0198274 A1    8/2013  Papakipos et al.
(Continued)

FOREIGN PATENT DOCUMENTS

KR    10-2008-0049513 A    6/2008
KR    10-2009-0039155 A    4/2009
(Continued)

OTHER PUBLICATIONS

Irene Monserrat Torres Hernandez et al. ("Analysis for the design of open applications on mobile devices", p. 126-131 (Year: 2013).*
(Continued)

*Primary Examiner* — Doon Y Chow
*Assistant Examiner* — Abdou K Seye
(74) *Attorney, Agent, or Firm* — Sughrue Mion, PLLC

(57) ABSTRACT

Provided are an electronic device that interoperates with an external electronic device in association with an application, and a method therefor. To this end, an application-related interoperation method by an electronic device may include: receiving a file associated with at least one function performed in an application of an external electronic device from the external electronic device; storing the received file in a platform; recording, in the platform, data associated with an application executed in the electronic device; and
(Continued)

executing the data using the at least one function of the external electronic device.

11 Claims, 14 Drawing Sheets

(51) Int. Cl.
*G06F 13/38* (2006.01)
*H04W 12/06* (2021.01)
*H04L 29/08* (2006.01)
*H04L 29/06* (2006.01)

(56) References Cited

U.S. PATENT DOCUMENTS

| | | | |
|---|---|---|---|
| 2015/0134727 A1 | 5/2015 | Lee et al. | |
| 2015/0256638 A1* | 9/2015 | Schwartz | H04L 67/2828 709/203 |
| 2015/0261933 A1* | 9/2015 | Chiu | H04L 51/08 705/3 |
| 2015/0280933 A1* | 10/2015 | Choi | H04W 4/16 709/217 |
| 2015/0358043 A1* | 12/2015 | Jeong | H04B 1/385 455/411 |
| 2016/0094967 A1* | 3/2016 | Sulaiman | H04W 4/30 455/404.2 |
| 2016/0242107 A1 | 8/2016 | Yang et al. | |

FOREIGN PATENT DOCUMENTS

| | | |
|---|---|---|
| KR | 10-2011-0139446 A | 12/2011 |
| KR | 10-1117165 B1 | 3/2012 |
| KR | 10-2014-0088665 A | 7/2014 |
| KR | 10-2014-0125395 A | 10/2014 |
| KR | 10-2015-0034496 A | 4/2015 |
| KR | 10-2015-0054505 A | 5/2015 |
| WO | 2012/115742 A1 | 8/2012 |

OTHER PUBLICATIONS

Ms.Sona R.Pawara et al.(Instant Notification System In Heterogeneous Sensor network with deployment of XMPP protocol pp. 87-92 (Year: 2013).*
International Search Report dated May 12, 2017, issued by the International Searching Authority in counterpart International Patent Application No. PCT/KR2017/001231 (PCT/ISA/210).
Written Opinion dated May 12, 2017, issued by the International Searching Authority in counterpart International Patent Application No. PCT/KR2017/001231 (PCT/ISA/237).

* cited by examiner

ELECTRONIC DEVICE FOR PERFORMING APPLICATION-RELATED INTEROPERATION, AND METHOD THEREFOR

CROSS-REFERENCE TO RELATED APPLICATION(S)

This application is a National Phase Entry of PCT International Application No. PCT/KR2017/001231, which was filed on Feb. 3, 2017 and claims priority under 35 U.S.C. § 119 to Korean Patent Application No. 10-2016-0013446, filed on Feb. 3, 2016, and Korean Patent Application No. 10-2017-0015157, filed on Feb. 2, 2017, in the Korean Intellectual Property Office, the disclosures of which are incorporated by reference herein in their entireties.

TECHNICAL FIELD

The present disclosure generally relates to an electronic device, and more particularly, to an electronic device for interoperating an application with an external electronic device and a method therefor.

BACKGROUND ART

Recently, various services and additional functions provided by electronic devices have been gradually expanded. To increase the effective value of the electronic devices and to satisfy various demands from users, communication service providers or electronic device manufacturers are competitively developing electronic devices which provide more various functions and are differentiated from electronic devices of other companies. Also, companies that manufacture electronic devices may provide different operating systems of the electronic devices. For example, electronic devices of Samsung Electronics Co., Ltd. use the Android-based operating system, and electronic devices of Apple Inc. use the iOS-based operating system. In addition, electronic devices of the same manufacturer may use different operating systems according to on the feature of an electronic device. For example, the Galaxy series of Samsung Electronics Co., Ltd use Android but the Gear series use Tizen. Also, various wearable electronic devices that a user may wear on a body part are being introduced to the market, and users may have a plurality of electronic devices.

As described above, even though electronic devices are manufactured by the same manufacturer, the electronic devices may use different operating systems for the purposes of the electronic devices. Accordingly, a user highly desires to receive a service via a similar application without installing, in another electronic device, an application that has been installed in one electronic device, as if receiving the service via installing the same application.

DETAILED DESCRIPTION OF THE INVENTION

Technical Problem

As described above, as the number of types of electronic devices operating in various operating systems increases, applications of electronic devices are diversified. In order to provide a user with a service in consideration of continuity among electronic devices, application developers need to develop applications specified to an electronic device, which is drawback.

An application that is installable or an installed application is different for each electronic device. Accordingly, although electronic devices are connected, a user needs to go through a complicated process, such as directly installing an application and transmitting and receiving data, so as to combine unique functions of the electronic devices, which is inconvenient for the users. Accordingly, although the same platform is used, applications need to be developed in consideration of an electronic device, a version, or the like. It is difficult to develop all functions for each electronic device.

Therefore, there is a desire for a service that provides various services in addition to a communication service such as a voice call, text, or the like via different electronic devices.

Technical Solution

According to various embodiments of the present disclosure, a plurality of electronic devices existing in a communication area, such as Wi-Fi, Bluetooth, or the like perform application-related interoperation, whereby a remote function may be performed.

To this end, a method of performing application-related interoperation by an electronic device may include: receiving, from an external electronic device, a file associated with at least one function executed by an application of the external electronic device; storing the received file in a platform; recording, in the platform, data associated with an application executed by the electronic device; and executing the data using the at least one function of the external electronic device.

An electronic device for performing application-related interoperation may include: a communication unit configured to receive, from an external electronic device, a file associated with at least one function performed by an application of the external electronic device; a memory configured to store the received file in a platform; and a processor configured to record, in the platform, data associated with an application executed by the electronic device, and to execute the data using the at least one function of the external electronic device.

Advantageous Effects

According to various embodiments of the present disclosure, provided are an electronic device that performs application-related interoperation between the electronic device and an external electronic device, and a method therefor, whereby the electronic device can use an application installed in another electronic device without separate installation. Through the above, a user can upload a video or an image broadcasted in a TV to an electronic device produced by a company that manufactures the TV, and also can upload the same to an electronic device produced by a different company, without uploading the same to a cloud.

As described above, the present disclosure enables the user to use an application specified to each electronic device, via another electronic device, whereby the functions of applications become diversified and developers can readily develop applications. Furthermore, an application existing in only an electronic device may be utilized via a wearable device and home appliance such as a TV or the like.

MODE FOR CARRYING OUT THE INVENTION

Figure 1:
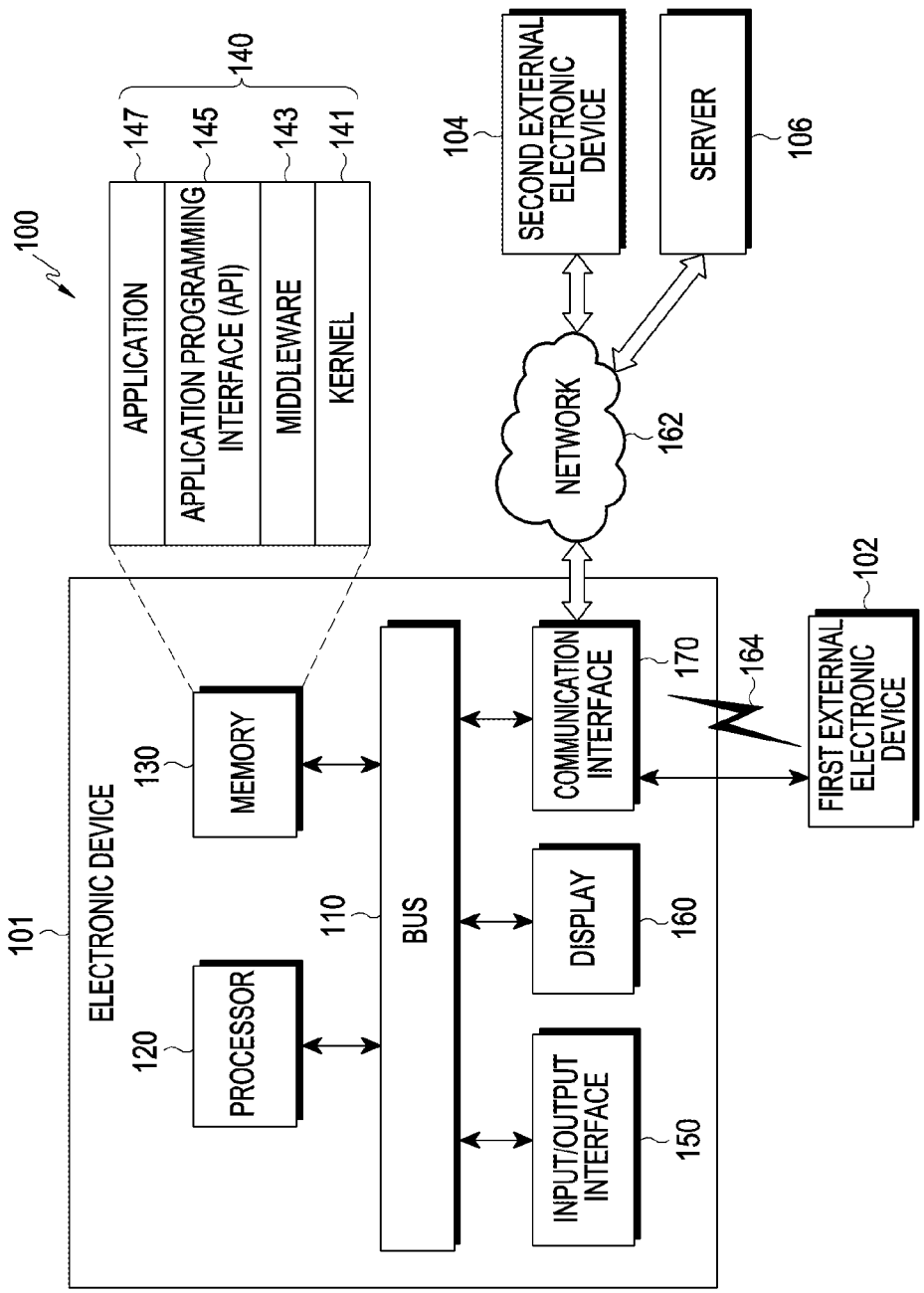
FIG. 1 is a diagram illustrating an electronic device 101 in a network environment 100 according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 in a network environment 100, according to various embodiments.

The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that interconnects the elements 110 to 170 and delivers communication (e.g., a control message and/or data) between the elements 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, commands or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface via which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities to use the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned to the at least one of the application programs.

The API 145 is an interface via which the applications 147 control functions provided from the kernel 141 or the middleware 143, and may include, for example, at least one interface or function (e.g., command) for file control, window control, image processing, or text control.

The input/output interface 150 may function as, for example, an interface that can forward commands or data, which are input from a user or an external device, to the other element(s) of the electronic device 101. Furthermore, the input/output interface 150 may output commands or data, which are received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, symbols, and the like) for a user. The display 160 may include a touch screen and may receive, for example, a touch, gesture, proximity, or hovering input using an electronic pen or the user's body part.

The communication interface 170, for example, may set communication between the electronic device 101 and an external device (e.g., a first external electronic device 102, a second external electronic device 104, or a server 106). For example, the communication interface 170 may be connected to a network 162 via wireless or wired communication to communicate with the external device (e.g., the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164 may include at least one of, for example, Wi-Fi, Bluetooth, Near Field Communication (NFC), Global Navigation Satellite System (GNSS), and the like. The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (e.g., a LAN or a WAN), the Internet, and a telephone network.

Each of the first and second external electronic devices 102 and 104 may be of a type that is the same as, or different from, the electronic device 101. According to an embodiment, the server 106 may include a group of one or more servers. According to various embodiments, all or some of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic device may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
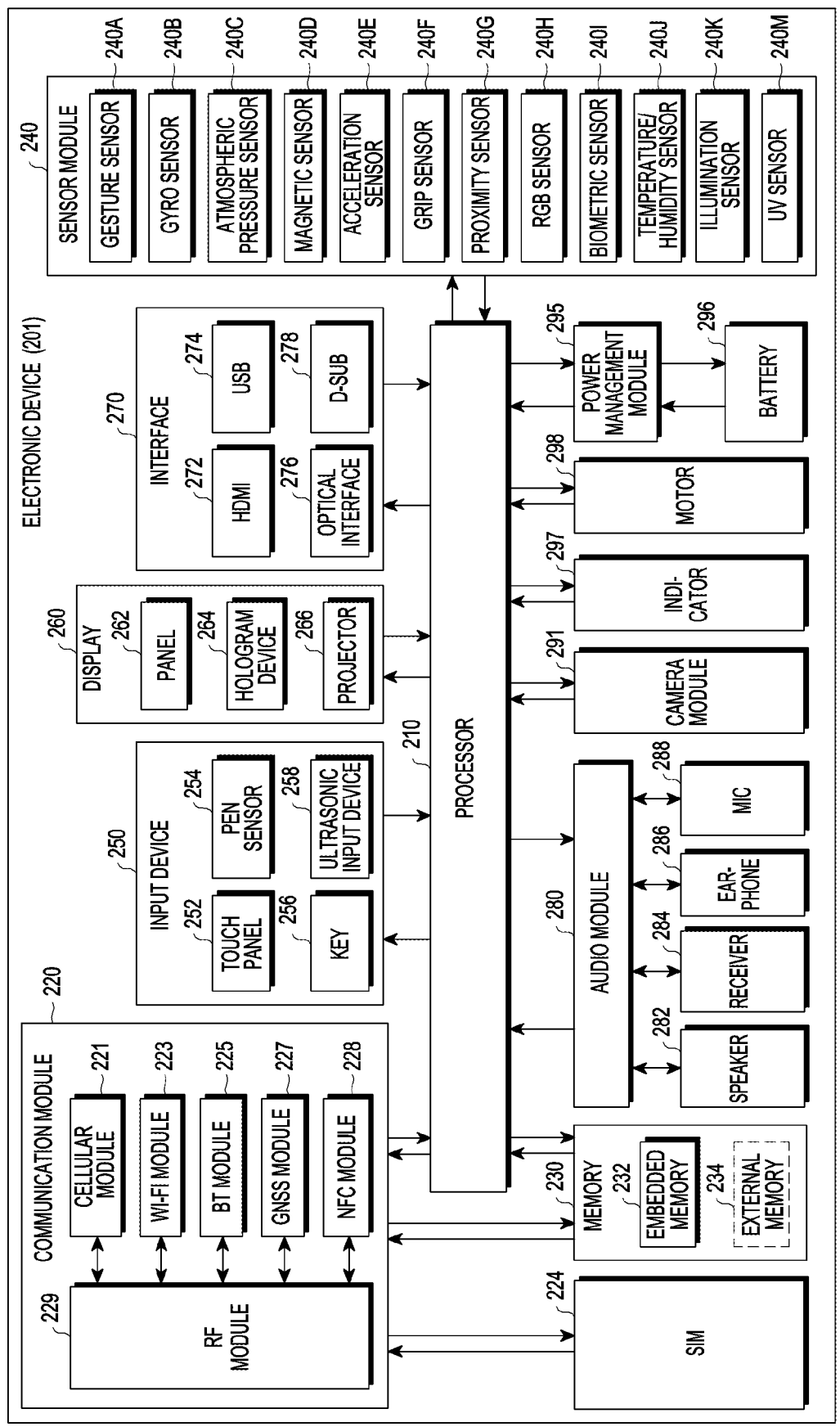
FIG. 2 is a block diagram of an electronic device 201 according to various embodiments.

FIG. 2 is a block diagram of an electronic device 201 according to various embodiments.

The electronic device 201 may include, for example, the whole or a part of the electronic device 101 illustrated in FIG. 1. The electronic device 201 may include one or more Application Processors (APs) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be implemented as, for example, a System on Chip (SoC). According to an embodiment, the processor 210 may further include a Graphic Processing Unit (GPU) and/or an image signal processor. The processor 210 may include at least some of the elements illustrated in FIG. 2 (e.g., a cellular module 221). The processor 210 may load, in a volatile memory, commands or data received from at least one of the other elements (e.g., a non-volatile memory) to process the loaded commands or data, and may store various types of data in the non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module, a Glonass module, a Beidou module, or a Galileo module), an NFC module 228, and a Radio Frequency (RF) module 229.

The cellular module 221 may provide, for example, a voice call, a video call, a text message service, an Internet service, or the like via a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a Communication Processor (CP).

For example, each of the Wi-Fi module 223, the BT module 225, the GNSS module 227, and the NFC module 228 may include a processor for processing data transmitted/received via the corresponding module. According to some embodiments, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (e.g., an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GNSS module 227, and the NFC module 228 may transmit/receive an RF signal via a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disk drive, a Solid State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 via various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, via a microphone (e.g., a microphone 288) to identify data corresponding to the detected ultrasonic waves.

The display 260 (e.g., the display 160) may include a panel 262, a hologram device 264 or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three dimensional image in the air by using light interference. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication circuit 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 145 illustrated in FIG. 1. The audio module 280 may process sound information that is input or output via, for example, a speaker 282, a receiver 284, earphones 286, the microphone 288, and the like.

The camera module 291 is a device that can photograph a still image and a video. According to an embodiment, the camera module 291 may include one or more image sensors (e.g., a front sensor or a rear sensor), a lens, an Image Signal Processor (ISP), or a flash (e.g., an LED, a xenon lamp, or the like).

The power management module 295 may manage, for example, the power of the electronic device 201. The electronic device 201 may be an electronic device that is provided with power via a battery, but may not be limited thereto. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, and the like. Although not illustrated, the electronic device 201 may include a processing device (e.g., a GPU) for supporting mobile TV. The processing device for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
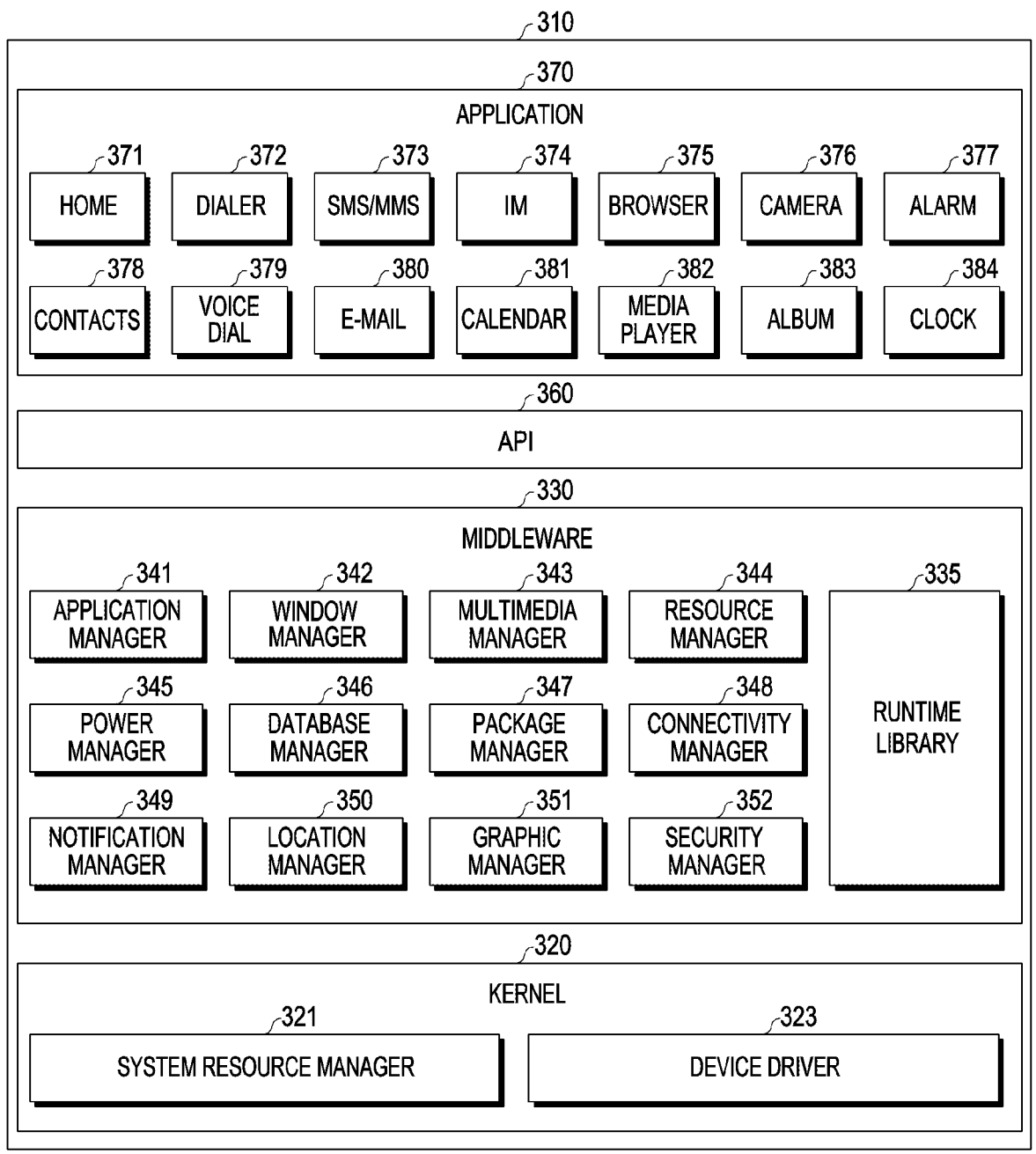
FIG. 3 is a block diagram of a program module according to various embodiments.

FIG. 3 is a block diagram of a program module according to various embodiments.

According to an embodiment, the program module 310 (e.g., the program 140) may include an Operating System (OS) that controls resources relating to an electronic device (e.g., the electronic device 101) and/or various applications (e.g., the application programs 147) running on the operating system. The operating system may be, for example, Android™, iOS™, Windows™, Symbian™, Tizen™, Bada™, or the like.

The program module 310 may include a kernel 320, middleware 330, an Application Programming Interface (API) 360, and/or applications 370. At least a part of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 via the API 360 such that the applications 370 can efficiently use limited system resources within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function via a programming language while the applications 370 are being executed. The runtime library 335 may perform input/output management, memory management, the functionality for an arithmetic function, and the like.

The application manager 341 may manage, for example, the life cycle of at least one of the applications 370. The window manager 342 may manage Graphical User Interface (GUI) resources used on a screen. The multimedia manager 343 may determine formats required for reproducing various media files and may encode or decode a media file using a coder/decoder (codec) suitable for a corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power, and may provide power information required for the operation of the electronic device. The database manager 346 may generate, search for, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or report an event, such as an arrival message, an appointment, a proximity notification, and the like, in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, and the like. According to an embodiment, when the electronic device (e.g., the electronic device 101) has a telephone call function, the middleware 330 may further include a telephony manager that manages a voice or video call function of the electronic device.

The middleware 330 may include a middleware module that forms a combination of various functions of the above-described elements. The middleware 330 may provide modules specialized according to the types of operating systems in order to provide differentiated functions. Furthermore, the middleware 330 may dynamically remove some of the existing elements, or may add new elements.

The API 360 (e.g., the API 145) is, for example, a set of API programming functions, and may be provided in different configurations according to operating systems. For example, in the case of Android or iOS, one API set may be provided for each platform, and in the case of Tizen, two or more API sets may be provided for each platform.

The applications 370 (e.g., the application programs 147) may include, for example, one or more applications that are capable of performing functions such as a home 371, a dialer 372, an SMS/MMS 373, an Instant Message (IM) 374, a browser 375, a camera 376, an alarm 377, contacts 378, a voice dialer 379, an email 380, a calendar 381, a media player 382, an album 383, a clock 384, a health care function (e.g., measuring exercise quantity or blood sugar), a environment information provision function (e.g., atmospheric pressure, humidity, or temperature information), and the like.

According to an embodiment, the applications 370 may include an application (hereinafter, referred to as an "information exchange application" for ease of description) that supports information exchange between an electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of delivering, to the external electronic device (e.g., the electronic device 102 or 104), notification information generated by other applications (e.g., an SMS/MMS application, an email application, a health care application, an environmental information application, and the like) of the electronic device. Furthermore, the notification relay application may, for example, receive notification information from the external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some elements thereof) or a function of adjusting the brightness (or resolution) of a display), applications that operate in the external electronic device, or services (e.g., a call service, a message service, and the like) that are provided by the external electronic device.

According to an embodiment, the applications 370 may include applications (e.g., a health care application of a mobile medical appliance, and the like) designated according to the attributes of an external electronic device (e.g., the electronic device 102 or 104). According to an embodiment, the applications 370 may include applications received from an external electronic device (e.g., the server 106 or the electronic device 102 or 104). According to an embodiment, the applications 370 may include a preloaded application or a third party application that may be downloaded from a server. The names of the elements of the program module 310, according to the embodiment illustrated in the drawing, may vary according to the type of operating system.

According to various embodiments, at least a part of the programming module 310 may be implemented as software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4:
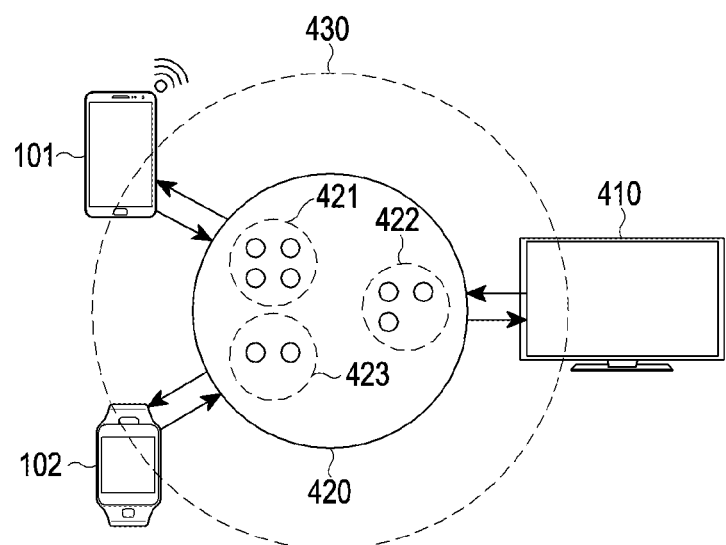
FIG. 4 is a schematic diagram illustrating a system in which a plurality of electronic devices perform application-related interoperation according to various embodiments of the present disclosure.

FIG. 4 is a schematic diagram illustrating a system in which a plurality of electronic devices according to various embodiments of the present disclosure performs application-related interoperation.

Referring to FIG. 4, the system in which the plurality of electronic devices perform application-related interoperation may include the electronic device 101, the first external electronic device 102, and a second external electronic device 410. A system according to the present disclosure may include a plurality of external electronic devices in addition to the first external electronic device 102 and the second external electronic device 410. The electronic devices may perform application-related interoperation in a communication area. According to an operating system, specifications, a manufacturer, or the like, at least one application may be installed in each electronic device. The electronic device 101 may configure a communication area 430. The electronic device 101 may configure a communication area (e.g., a hot spot) using at least one of Wi-Fi and Bluetooth. The electronic device 101 may configure a hot spot area via a communication scheme other than Wi-Fi and Bluetooth. In the present disclosure, a hot spot area may be configured via at least one external electronic device in addition to the electronic device 101.

The electronic device 101 may configure a platform that receives and stores a file associated with at least one function performed by an application of at least one external electronic device 102 and 410. The electronic device 101 may store the received file in the platform, and records, in the platform, data associated with an application executed by the electronic device, whereby the electronic device 101 may execute the data using the at least one function of the external electronic device. As described above, the electronic device 101 may generate a platform for registering an intent associated with at least one function executable by at least one application which has been installed or is currently installed in the electronic device 101. The platform may include a file associated with at least one function for each application executed by at least one external electronic device which exists or enters the communication area. The platform may be generated in a virtual space 420, and the virtual space 420 may be included in a partial area of the memory 130 of the electronic device 101. Also, the virtual space 420 may be included in a storage space of the first external electronic device 102. The virtual space 420 may include: an intent associated with at least one function executable by at least one application that has been installed or is currently installed in the electronic device 101; an intent associated with at least one function executable by at least one application that has been installed or is currently installed in the first external electronic device 102; and an intent associated with at least one function executable by at least one application that has been installed or is currently installed in the second external electronic device 410. The intent may include at least one function that is applied in common to applications executed by different operating systems for the same purpose. The intent may include at least one function that may be applied in common to different applications in different operating systems, and to even different applications which use the same operating system but have different specifications, different manufacturers, or different application developers. As described above, application-related interoperation may be performed among the electronic devices in the communication area 430 by storing, in a platform, the intent associated with each application of each electronic device existing in the communication area 430. The virtual space 420 may include a platform 421 indicating at least one function of the electronic device 101, a platform 423 indicating at least one function of the first external electronic device 102, and a platform 422 indicating at least one function of the second electronic device 410. The functions included in the platforms may be performed by different devices. For example, in the state in which the electronic device 101 configures a hot spot area via Wi-Fi, when the first external electronic device 102 exists in the hot spot area, the electronic device 101 may use at least one function stored in the platform of the first external electronic device 102.

Figure 5:
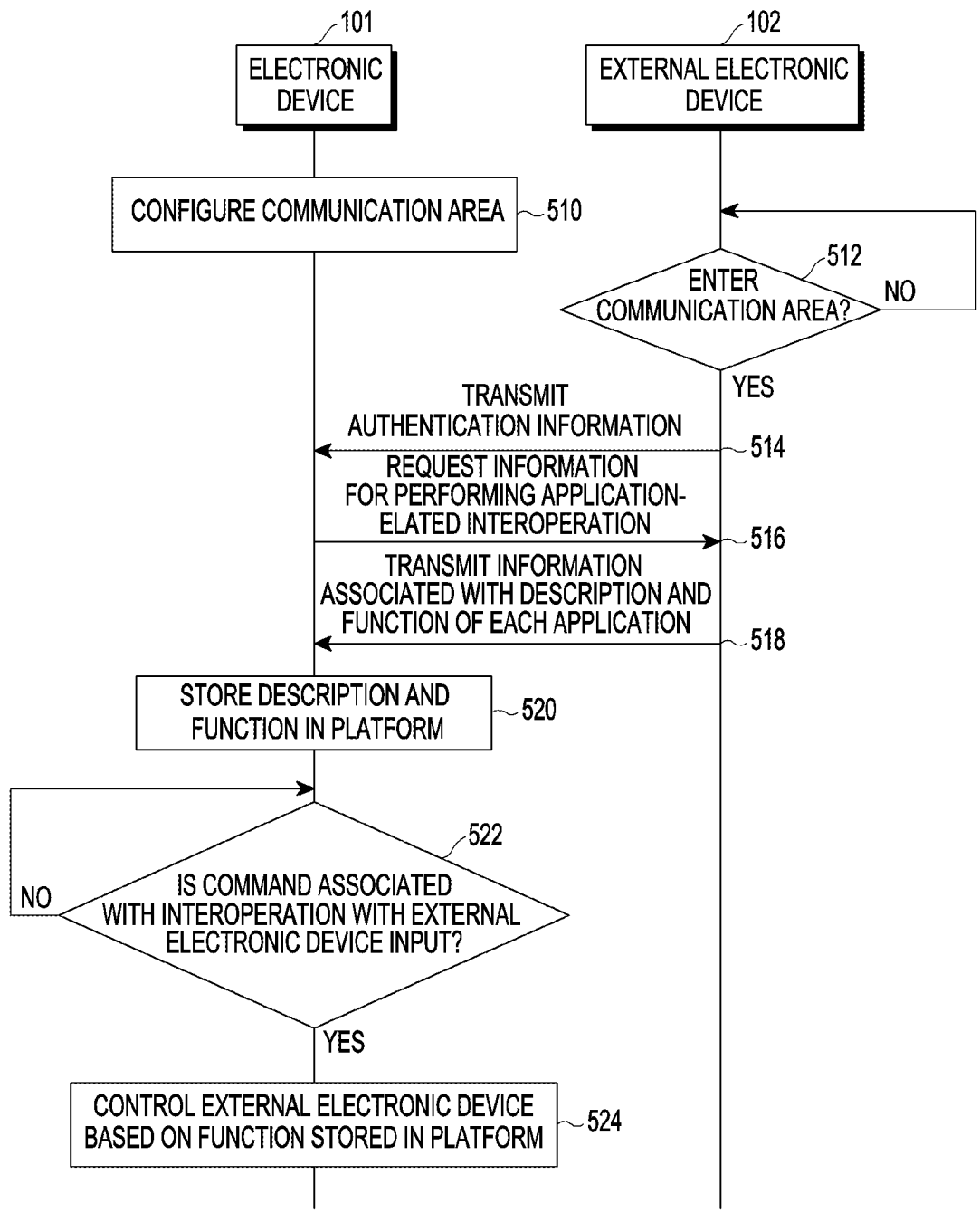
FIG. 5 is a flowchart illustrating a process that performs application-related interoperation among a plurality of electronic devices according to various embodiments of the present disclosure.

FIG. 5 is a flowchart illustrating a process that performs application-related interoperation among a plurality of electronic devices according to various embodiments of the present disclosure.

Hereinafter, referring to FIG. 5, a process of application-related interoperation among electronic devices according to various embodiments will be described as follows.

The electronic device 101 may configure a communication area in operation 510. The electronic device 101 may configure a communication area via Wi-Fi or Bluetooth. The electronic device 101 may configure a communication area (e.g., a hot spot) using at least one of Wi-Fi and Bluetooth. The electronic device 101 may configure a hot spot area via a communication scheme other than Wi-Fi and Bluetooth. In the present disclosure, a hot spot area may be configured via at least one external electronic device in addition to the electronic device 101.

The electronic device 102 may enter the communication area in operation 512. An operating system installed in the electronic device 101 may be the same as, or different from, an operating system installed in the external electronic device 102. The external electronic device 102 may detect entry to the communication area. The external electronic device 102 may detect entry to the communication area by detecting a signal transmitted in the communication area. The external electronic device 102 may detect entry to the communication area in response to reception of a signal associated with Wi-Fi or Bluetooth.

The external electronic device 102 may transmit authentication information to the electronic device 101 in operation 514. The electronic device 101 may transmit an inquiry about whether to receive a service using Wi-Fi or Bluetooth to the external electronic device 102 that enters the communication area. The external electronic device 102 may provide the inquiry about whether to receive the service to a user, and may receive information input by the user. For example, the external electronic device 102 may output information indicating that Wi-Fi or Bluetooth is usable, and display a pop-up window for inquiring about an ID and a password such that the user can use the Wi-Fi or Bluetooth. When the ID and the password are input, the external electronic device 102 may transmit, to the electronic device 101, authentication information including the input ID, password, and an identifier of the external electronic device 102. The electronic device 101 may store the received authentication information, and when the external electronic device 102 enters the communication area again, the electronic device 101 may automatically authenticate the external electronic device 102 without an authentication procedure.

The electronic device 101 may request, from the external electronic device 102, information for performing application-related interoperation in operation 516. When the authentication procedure with respect to the external electronic device 102 that enters the communication area is completed, the electronic device 101 may request information for performing application-related interoperation between the electronic device 101 and the external electronic device 102. The interoperation may indicate use of an application of a counterpart electronic device. The external electronic device 102 may recognize at least one function of each application installed in the external electronic device 102. The external electronic device 102 may recognize at least one function of the remaining (or other) applications excluding an application that is locked since security is required. Also, when the external electronic device 102 in the communication area installs a new application, the electronic device 101 may require information for performing application-related interoperation associated with the newly installed application. When the external electronic device 102 installs a new application, the external electronic device 102 may register an intent of the new application, and may transmit the registered intent to the electronic device 101. The electronic device 101 may request information for performing application-related interoperation from at least one electronic device existing in the communication area.

The external electronic device 102 may transmit information associated with at least one function and a description of each application to the electronic device 101 in operation 518. The external electronic device 102 may transmit information associated with at least one function performed by each application and a description of each application to the electronic device 101. For example, when a new application is installed, the external electronic device 102 may transmit information associated with at least one function and a description of the installed application to the electronic device 101.

The electronic device 101 may store the description and function in a platform in operation 520. The electronic device 101 may store, in the platform, the description and at least one function received from the external electronic device 102. The electronic device 101 may store a file including the description and at least one function in the platform. The file may include information associated with an intent that is registered in the external electronic device in response to installation of an application in the external electronic device 101 The platform may include a file associated with at least one function for each application executed by at least one external electronic device which exists or enters the communication area configured by the electronic device 101. The platform may be stored in a partial area of the memory 130 of the electronic device 101. Alternatively, when an application is newly installed in the electronic device 101, the electronic device 101 may register an intent of the newly installed application in the platform.

When a command associated with interoperation with an external electronic device is input in operation 522, the electronic device 101 may control the external electronic device, based on a function stored in the platform in operation 524.

The electronic device 101 may receive a user command associated with an application for which the electronic device 101 is to interoperate with the external electronic device 102. The electronic device 101 may receive user input for performing interoperation with the external electronic device 102 via at least one function registered (recorded) in the stored platform. The user may use the external electronic device 102 for a user's purpose via a function associated with each application stored in the electronic device 101. When an application is selected by the user, the electronic device 101 may execute the selected application, and may receive user input via the executed application. The electronic device 101 may convert data input via the user input, based on the stored platform, and may execute the converted data based on at least a part of an application of the external electronic device. The electronic device 101 may display an execution result via the display 160. The electronic device 101 may control the external electronic device 102 via at least one function and a description corresponding to the executed application. The electronic device 101 may transmit the converted data to the external electronic device 102. The electronic device 101 may transmit the converted data based on an extensible messaging and presence protocol (XMPP). The electronic device 101 may execute the application selected by the user. The electronic device 101 may compare data input by the user via the executed application with the description and function of the executed application stored in advance in the platform, and may determine data added (or changed) by the user. The electronic device 101 may inform the external electronic device 102 of the changed data, and the external electronic device 102 may execute the changed data via the registered function under the control of the electronic device 101.

Figure 6:
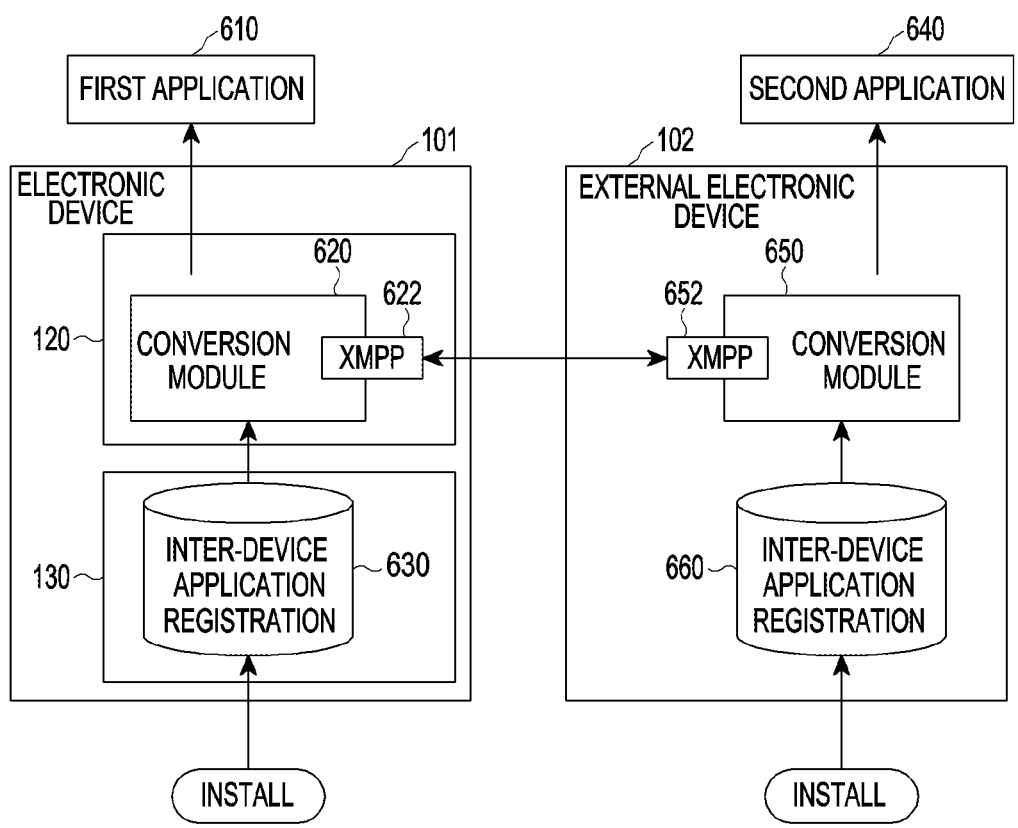
FIG. 6 is a block diagram of an electronic device and an external electronic device for performing application-related interoperation according to various embodiments of the present disclosure.

FIG. 6 is a block diagram of an electronic device and an external electronic device for performing application-related interoperation according to various embodiments of the present disclosure.

The processor 120 of FIG. 6 may perform at least one function or operation performed by the processor 120 of FIG. 1, and the memory 130 of FIG. 6 may perform at least one function or operation performed by the memory 130 of FIG. 1. When an application is installed, the electronic device 101 according to various embodiments may register, in a platform 630, at least one function and a description of the application between the electronic device 101 and the external electronic device 102. The electronic device 101 may perform intent filtering with respect to the installed application and may store the description and at least one function in the platform 630. For example, when the operating system of the electronic device 101 is Android, and the installed application is an application for transmitting and receiving a message, the electronic device 101 may receive the application from Android App Store, and may install the same. The electronic device 101 may perform intent filtering so as to extract, from the installed application, a common function that is common to an application that operates for the same purpose in a different operating system, and may store the extracted common function in the platform 630. For example, when the application is a message transmission/reception application, the common function may include various functions, such as a message transmission function, a message read function, a message download function, a message replay function, and the like.

When a user executes a first application 610 that is capable of transmitting a message, and inputs data that the user desires to transmit, the electronic device 101 may receive data input by the user via the executed application. The electronic device 101 may convert the data input by the user, based on a file stored in advance (e.g., a file including a description and a function of an application that is capable of executing the data in the external electronic device 102). The electronic device 101 may convert a message format including the input data such that the data is executed by a second application 640 of the external electronic device 102 that receives the message. The electronic device 101 may transmit the converted data to the external electronic device 102 based on an XMPP 622, so as to execute the converted data based on at least a part of the application of the external electronic device 102.

In the same manner, when an application is installed, the external electronic device 102 according to various embodiments may register, in a platform 660, at least one function and a description of the application between the electronic device 101 and the external electronic device 102. The external electronic device 102 may perform intent filtering with respect to the installed application and may store the description and at least one function in the platform 660. For example, when the operating system of the external electronic device 102 is Tizen, and the installed application is an application for transmitting and receiving a message, the external electronic device 102 may receive the application from Tizen App Store, and may install the same. The external electronic device 102 may perform intent filtering so as to extract, from the installed application, a common function that is common to an application that operates for the same purpose in a different operating system, and may store the extracted common function in the platform 660. For example, when the application is a message transmission/reception application, the common function may include various functions, such as a message transmission function, a message read function, a message download function, a message replay function, and the like.

When converted data is received from the electronic device 101 via an XMPP 652, the external electronic device 102 may execute the received data via the second application 640. Alternatively, when data received from the electronic device 101 is not in a converted state, the external electronic device 102 may convert the received data to be suitable for the second application via a conversion module 650, such that the data may be executed by the second application 640. The external electronic device 102 may convert the received data based on a file stored in advance (e.g., a file including a description and a function of an application that is capable of executing the data in the external electronic device 102). The external electronic device 102 may execute the data based on at least a part of the second application 640. A result executed by the external electronic device 102 may be display on the display 160 of the electronic device 101.

Figure 7A:
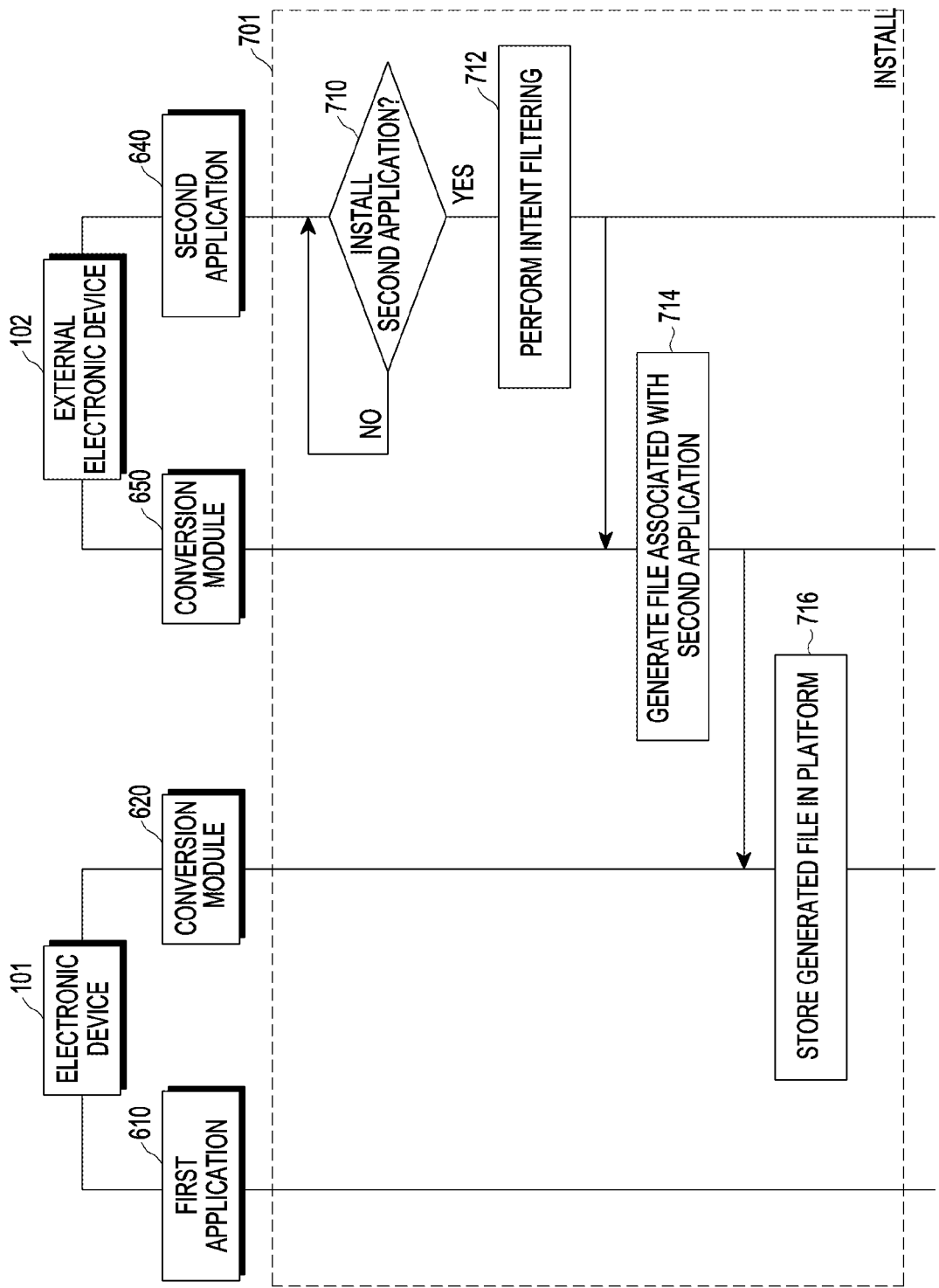
FIG. 7A is a diagram illustrating a pre-processing process for performing application-related interoperation between an electronic device and an external electronic device according to various embodiments of the present disclosure.
Figure 7B:
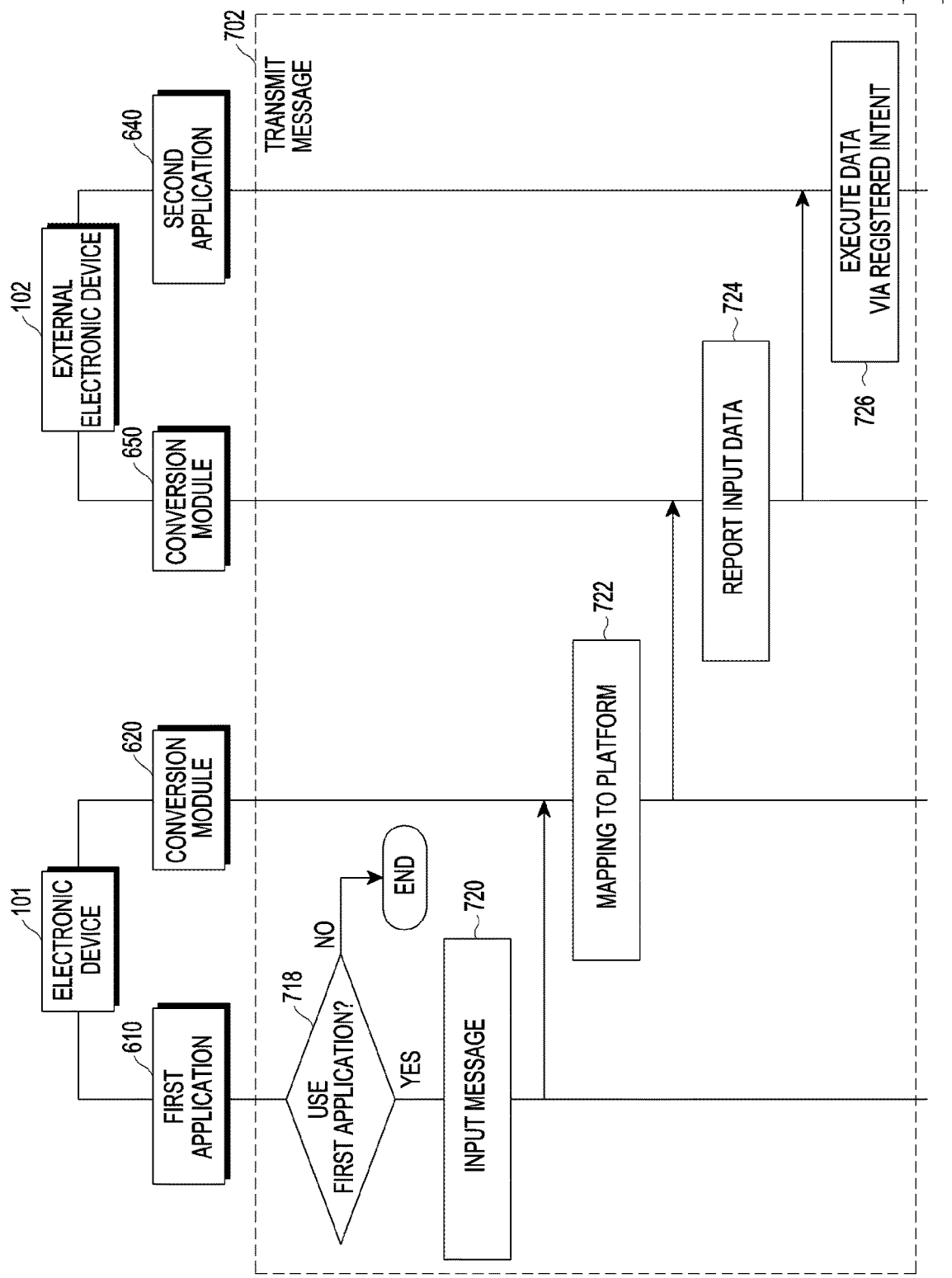
FIG. 7B is a diagram illustrating a process of transmitting a message between an electronic device and an external electronic device according to various embodiments of the present disclosure.

FIG. 7A is a diagram illustrating a pre-processing process for performing application-related interoperation between an electronic device and an external electronic device according to various embodiments of the present disclosure. FIG. 7B is a flowchart of a process of transmitting a message between an electronic device and an external electronic device according to various embodiments of the present disclosure.

Hereinafter, a process of installing an application and transmitting a message, which is performed between an electronic device and an external electronic device according to various embodiments of the present disclosure, will be described with reference to FIGS. 7A and 7B. First, it is assumed that the first application 610 executed by the electronic device 101 and the second application 640 executed by the external electronic device 102 are applications that are capable of transmitting and receiving a written message. Also, it is assumed that the electronic device 101 and the external electronic device 102 have different operating systems.

When the second application 640 is installed in operation 710, the external electronic device 102 may perform intent filtering in operation 712. When the second application 640 is installed, the external electronic device 102 may perform filtering so as to obtain a description and at least one function which is capable of being used in common by applications of the electronic device 101 and the external electronic device 102. The external electronic device 102 may perform filtering so as to obtain a description and at least one function associated with each application installed in advance, and a description and at least one function associated with a currently installed application.

The external electronic device 102 may generate a file associated with the application in operation 714. The conversion module 650 of the external electronic device 102 may generate, for each application, a file including a description and at least one function associated with each application installed in advance. Alternatively, the external electronic device 102 may generate a file including a description and at least one function associated with a currently installed application. The conversion module 650 of the external electronic device 102 may perform intent filtering so as to extract, from an application that has been installed in advance or is currently installed, a common function which is common to an application operating for the same purpose in a different operating system. The external electronic device 102 may store the generated file in the platform. The external electronic device 102 may transmit the generated file to the electronic device 101 via Bluetooth or Wi-Fi.

The electronic device 101 may store the file received from the external electronic device 102 in the platform in operation 716. The electronic device 101 may receive a file including information associated with an intent registered in the external electronic device in response to the installation of the application in the external electronic device 102. The file may be received when the external electronic device installs or updates an application, or when the external electronic device enters a communication area configured by the electronic device. The electronic device 101 may store the file received from the external electronic device 102 in the platform, such that the first application 610 and the second application 640 interoperate. When an application corresponding to at least one function included in the received file is executed, the electronic device 101 may execute data input via the executed application, using the second application 640. The operations (operations 710 to 716) are a process for performing application-related interoperation between the electronic device 101 and the external electronic device 102. The external electronic device 102 transmits a file including a description and at least one function of the installed application to the electronic device 101, and the electronic device 101 may store the received file in the platform.

When a user desires to write a message and selects the first application 610 in operation 718, the electronic device 101 may execute the first application 610 and may receive input of a message from the user in operation 720. The first application 610 and the second application 640 may include various common functions for writing a message and for transmitting and receiving a written message. The common function may include various functions, such as a message transmission function, a message read function, a message download function, a message replay function, and the like. When a message is input via the first application, the electronic device 101 may analyze the input message via a description and at least one function which are associated with the first application and are stored in advance in the platform.

The electronic device 101 may map the input data to the platform in operation 722. The electronic device 101 may map a description and at least one function of the first application 610 via which the message is input and a description and at least one function that is stored in advance before the message is input. Via the mapping, the electronic device 101 may determine the data input by the user. The conversion module 620 of the electronic device 101 may convert data input via a user input, based on a file stored in advance in the platform.

The electronic device 101 may inform the external electronic device 102 of the input data in operation 724. The electronic device 101 may transmit the input data to the external electronic device 102 via an XMPP. The external electronic device 102 may apply the data received from the electronic device 101 to the second application 640 that is registered in advance. The external electronic device 102 may map data applied to each function of the first application 610 to each function of the second application 640, so as to execute the data received from the electronic device 101.

The external electronic device 102 may execute the data received from the external electronic device 101 via an intent registered in advance in operation 726. The electronic device 101 may execute the data using at least one function of the external electronic device 102. The external electronic device 102 may execute the data received from the electronic device 101, via an intent registered (or stored) when the second application 640 is installed. The operations (operations 718 to 726) use applications interoperating between the electronic device 101 and the external electronic device 102, such that the electronic device 101 transmits a message to the external electronic device 102 and the external electronic device 102 may output the message transmitted by the electronic device 101, via the second application 640, although an application that is different from the first application 610 of the electronic device 101 is installed in the external electronic device 102. The external electronic device 102 registers a description and at least one function associated with the second application 640 and thus, the external electronic device 102 may be capable of executing a file received from the electronic device 101 although the electronic device 101 writes a message via an application different from the second application.

Figure 8:
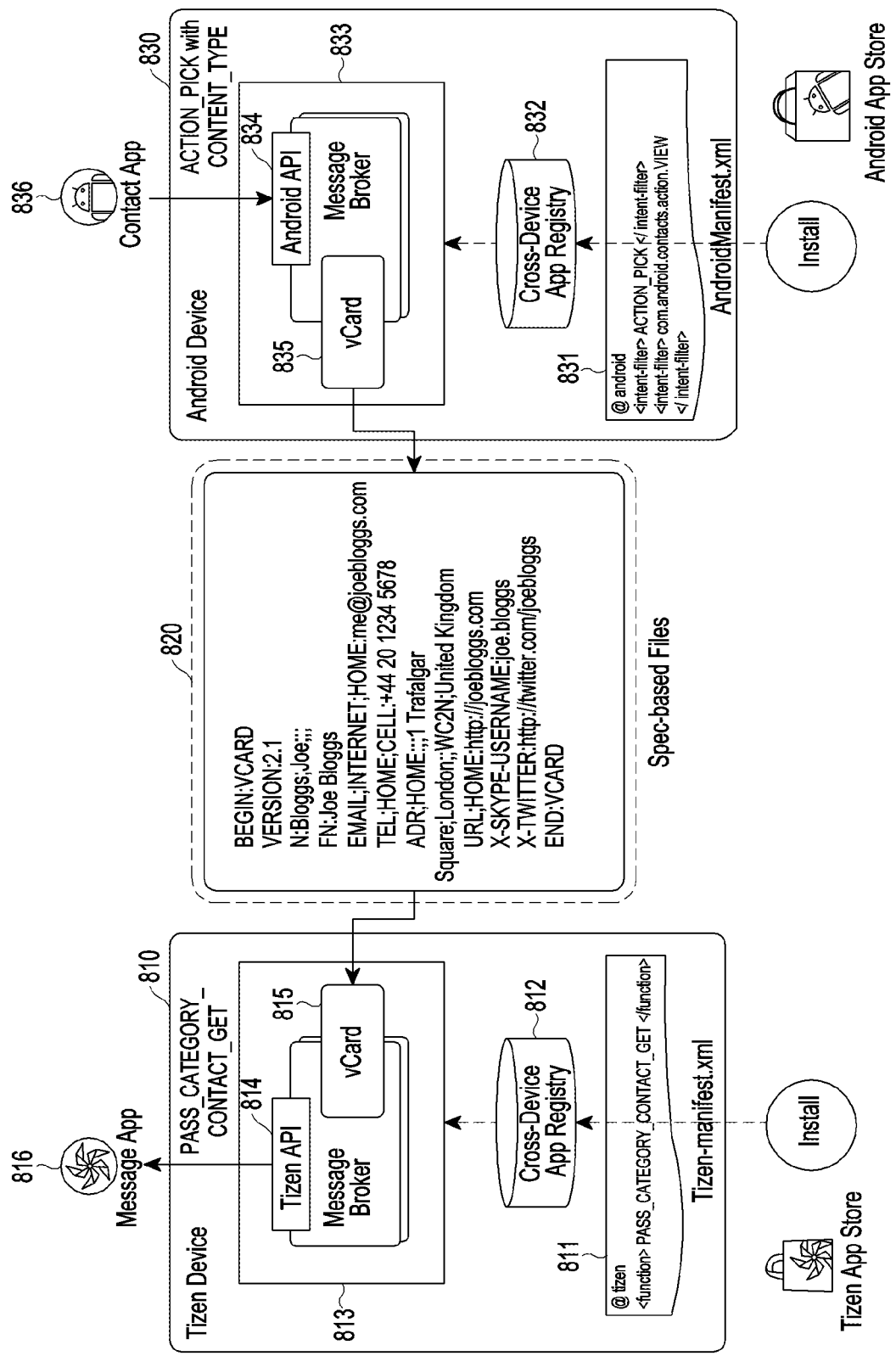
FIG. 8 is a diagram illustrating an example of performing application-related interoperation between a first electronic device and a second electronic device according to an embodiment of the present disclosure.

FIG. 8 is a diagram illustrating an example of performing application-related interoperation between a first electronic device and a second electronic device according to an embodiment of the present disclosure.

In FIG. 8, a first electronic device 810 may declare, via an XML 811, a description and at least one function of an application that the first electronic device 810 desires to share with a second electronic device 830. When a contacts application is installed, the first electronic device 810 may register, in a platform 812, a description and at least one function associated with the contacts application that the first electronic device 810 desires to share with the second electronic device 830, based on the declared XML 811. The electronic device 810 performs filtering with respect to each installed application and may store a description and at least one function in the platform 812. For example, when the operating system of the first electronic device 810 is Tizen, and an installed application is a contacts application for transmitting and receiving a message, the first electronic device 810 may receive the contacts application from Tizen App Store and may install the same. The first electronic device 810 may perform filtering so as to extract a common function such that the description and the at least one function of the contacts application are used in common in a different operating system (e.g., Android) based on the XML 811, and may store the extracted common function in the platform 812. For example, when the application is a message transmission/reception application, the common function may include various functions, such as a message transmission function, a voice call connection function, a video call connection function, a contacts deletion function, and the like.

Subsequently, when a user executes a message application 816 that is capable of transmitting a message, and inputs data that the user desires to transmit, the first electronic device 810 may receive data input by the user via the executed contacts application. The first electronic device 810 may convert the data input by the user, based on a file stored in advance (e.g., a file including a description and function of an application that is capable of executing the data in the second electronic device 830). The electronic device 810 may convert a message format including the input data, such that the data is executed by a contacts application 836 of the second electronic device 830 that receives the message. The first electronic device 810 may use a vCard 815 which may be used in common in applications operating in different operating systems, such that the input data is executed by the second electronic device 830. A Tizen API 814 may convert a message format using the vCard 815. The first electronic device 810 may transmit the converted data to the second electronic device 830 based on the vCard 815, so as to execute the converted data based on at least a part of the contacts application of the second electronic device 830.

In the same manner, the second electronic device 830 may declare, via an XML 831, a description and at least one function of an application that the second electronic device 830 desires to share with the first electronic device 810. When a contacts application is installed, the second electronic device 830 may register, in a platform 832, a description and at least one function associated with the contacts application that the second electronic device 830 desires to share with the first electronic device 810, based on the declared XML 831. The second electronic device 830 may perform filtering with respect to each installed application and may store a description and at least one function in the platform 832. For example, when the operating system of the second electronic device 830 is Android, and an installed application is a contacts application, the second electronic device 830 may receive the contacts application from Android App Store, and may install the same. The second electronic device 830 may perform filtering so as to extract a common function such that the description and the at least one function of the contacts application are used in common in a different operating system (e.g., Tizen) based on the XML 831, and may store the extracted common function in the platform 832. For example, when the application is a contacts application, the common function may include various functions, such as a message transmission function, a voice call connection function, a video call connection function, a contacts deletion function, and the like.

Subsequently, when a user executes the contacts application 836, and inputs data that the user desires to transmit, the second electronic device 830 may receive data input by the user via the executed contacts application. The second electronic device 830 may convert the data input by the user, based on a file stored in advance (e.g., a file including a description and function of an application that is capable of executing the data in the first electronic device 810). The second electronic device 830 may convert a message format including the input data, such that the data is executed by the contacts application 816 of the first electronic device 810 that receives the message. The second electronic device 830 may use a vCard 835 which may be used in common in applications operating in different operating systems, such that the input data may be executed by the first electronic device 810. An Android API 834 may convert a message format using the vCard 835. The second electronic device 830 may transmit the converted data to the first electronic device 810 based on the vCard 835, so as to execute the converted data based on at least a part of the contacts application of the first electronic device 810.

A block 820 is a vCard which is a format applied in common to the contacts application installed in the first electronic device 810 and the contacts application installed in the second electronic device 830. The vCard generally has a platform related to contacts, and is a format that is used in common in applications operating in different operating systems.

Figure 9:
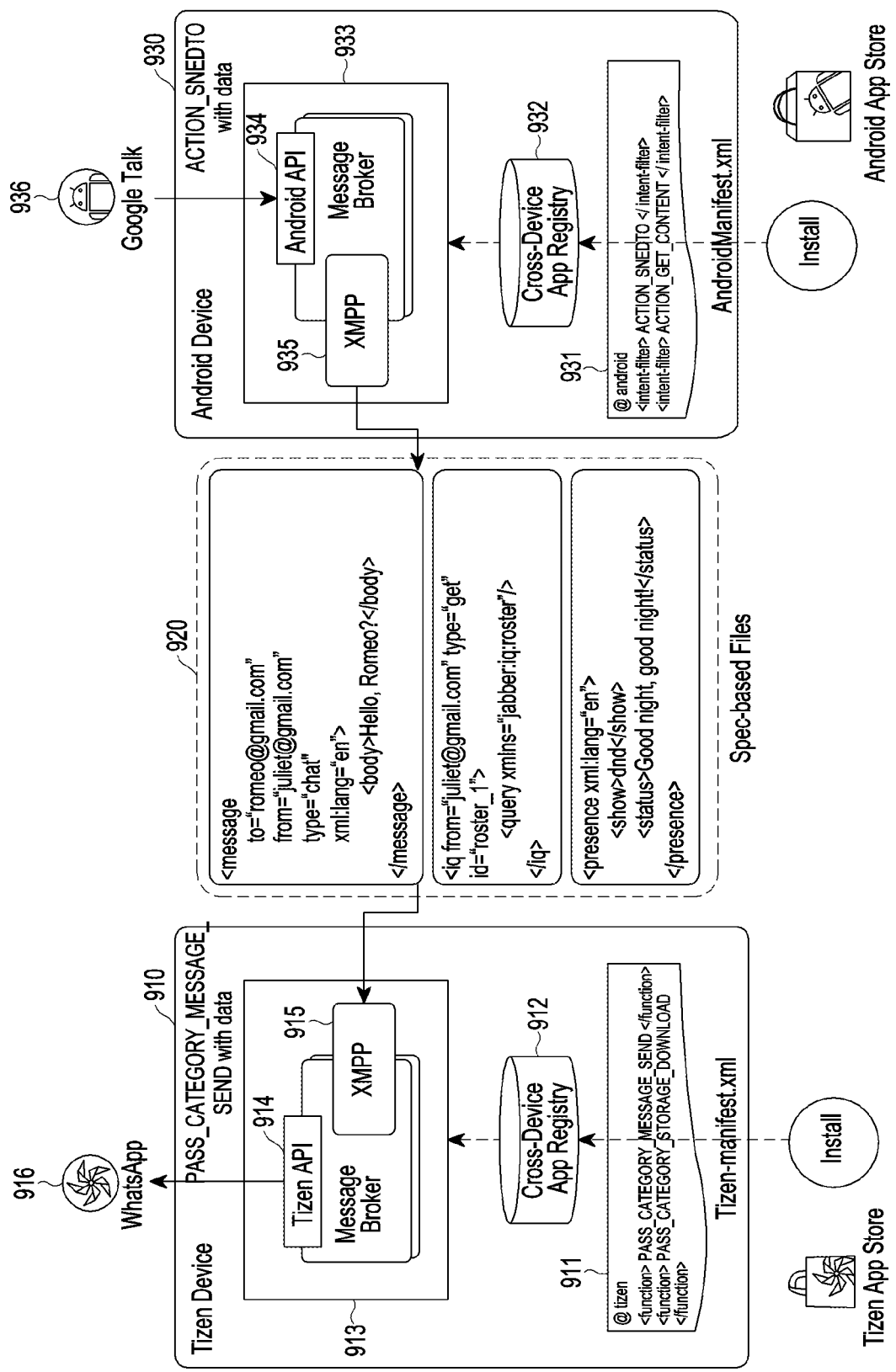
FIG. 9 is a diagram illustrating an example of performing application-related interoperation between a first electronic device and a second electronic device according to another embodiment of the present disclosure.

FIG. 9 is a diagram illustrating an example of performing application-related interoperation between a first electronic device and a second electronic device according to another embodiment of the present disclosure.

In FIG. 9, a first electronic device 910 may declare, via an XML 911, a description and at least one function of an application that the first electronic device 910 desires to share with a second electronic device 930. When a message application capable of transmitting and receiving a message is installed, the first electronic device 910 may register, in a platform 912, a description and at least one function associated with the message application that the first electronic device 910 desires to share with the second electronic device 930, based on the declared XML 911. The first electronic device 910 performs filtering with respect to each installed application and may store a description and at least one function in the platform 912. For example, when the operating system of the first electronic device 910 is Tizen, and an installed application is a contacts application for transmitting and receiving a message, the first electronic device 910 may receive the contacts application from Tizen App Store and may install the same. The first electronic device 910 may perform filtering so as to extract a common function such that the description and the at least one function of the contacts application are used in common in a different operating system (e.g., Android) based on the XML 911, and may store the extracted common function in the platform 912. For example, when the application is a contacts application for transmitting and receiving a message, the common function may include various functions, such as a message transmission function, a message read function, a message download function, a message replay function, and the like.

Subsequently, when a user executes a message application 916 that is capable of transmitting a message, and inputs data that the user desires to transmit, the first electronic device 910 may receive data input by the user via the executed message application. The first electronic device 910 may convert the data input by the user, based on a file stored in advance (e.g., a file including a description and function of an application that is capable of executing the data in the second electronic device 930). The electronic device 910 may convert a message format including the input data, such that the data is executed by a message application 936 of the second electronic device 930 that receives the message. The first electronic device 910 may use an XMPP 915 which is a format that may be used in common in applications operating in different operating systems, such that the input data can be executed by the second electronic device 930. A Tizen API 914 may convert a message format using the XMPP 915. The first electronic device 910 may transmit the converted data to the second electronic device 930 based on the XMPP 915, so as to execute the converted data based on at least a part of the message application of the second electronic device 930.

In the same manner, the second electronic device 930 may declare, via an XML 931, a description and at least one function of an application that the second electronic device 930 desires to share with the first electronic device 910. When a message application is installed, the second electronic device 930 may register, in a platform 932, a description and at least one function associated with the message application that the second electronic device 930 desires to share with the first electronic device 910, based on the declared XML 931. The second electronic device 930 may perform filtering with respect to each installed application and may store a description and at least one function in the platform 932. For example, when the operating system of the second electronic device 930 is Android, and an installed application is a message application, the second electronic device 930 may receive the message application from Android App Store, and may install the same. The second electronic device 930 may perform filtering so as to extract a common function such that the description and the at least one function of the contacts application are used in common in a different operating system (e.g., Tizen) based on the XML 931, and may store the extracted common function in the platform 932. For example, when the application is a message application, the common function may include various functions, such as a message transmission function, a message read function, a message download function, a message replay function, and the like.

Subsequently, when a user executes the message application 936 and inputs data that the user desires to transmit, the second electronic device 930 may receive the data input by the user via the executed message application. The second electronic device 930 may convert the data input by the user, based on a file stored in advance (e.g., a file including a description and function of an application that is capable of executing the data in the first electronic device 910). The second electronic device 930 may convert a message format including the input data, such that the data is executed by the message application 916 of the first electronic device 910 that receives the message. The second electronic device 930 may use an XMPP 935 which is a format that may be used in common in applications operating in different operating systems, such that the input data can be executed by the first electronic device 910. An Android API 934 may convert a message format using the XMPP 935. The second electronic device 930 may transmit the converted data to the first electronic device 910 based on the XMPP 935, so as to execute the converted data based on at least a part of the message application of the first electronic device 910.

A block 920 is an XMPP which is a format applied in common to the message application installed in the first electronic device 910 and the message application installed in the second electronic device 930. The XMPP generally has a platform related to message transmission and reception, and is a format that is used in common in applications operating in different operating systems.

Figure 10:
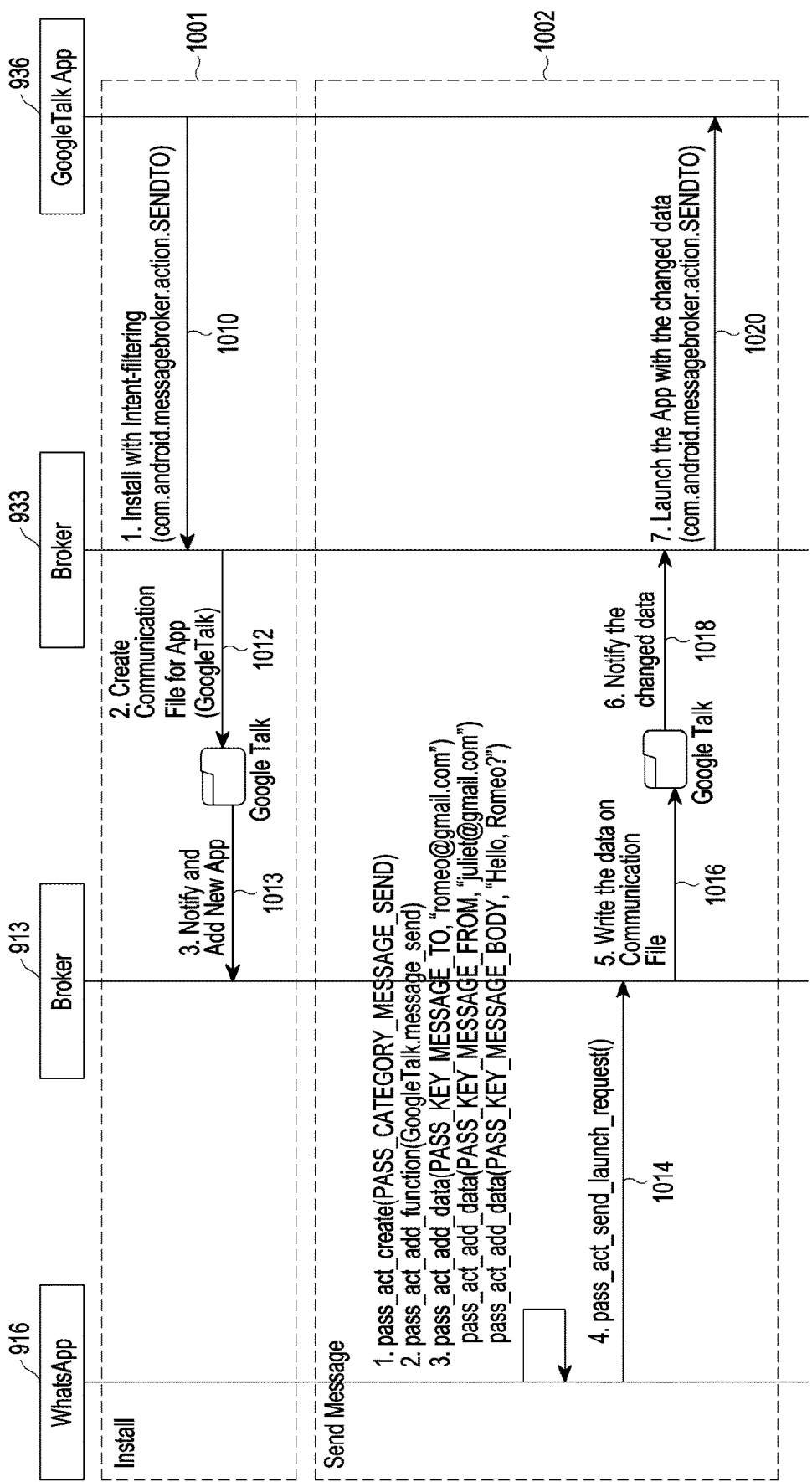
FIG. 10 is a flowchart illustrating a process of transmitting a message between a first electronic device and a second electronic device according to an embodiment of the present disclosure.

FIG. 10 is a flowchart illustrating a process of transmitting a message between a first electronic device and a second electronic device according to an embodiment of the present disclosure.

In FIG. 10, a block 1001 indicates a pre-processing process for performing application-related interoperation between a first electronic device and a second electronic device, and a block 1002 indicates a process for transmitting a message between the first electronic device and the second electronic device.

Hereinafter, referring to FIG. 10, it is assumed that the first application 916 operating in the first electronic device and the second application 936 operating in the second electronic device are applications capable of transmitting and receiving a message. It is assumed that the different operating systems are installed in the first electronic device and the second electronic device. For example, Tizen is installed as the operating system of the first electronic device, and Android is installed as the operating system of the second electronic device.

When second application 936 is installed, the second electronic device may perform intent filtering in operation 1010. When the second application 936 is installed, the second electronic device may perform filtering so as to obtain a description and at least one function which are capable of being used in common by applications of the first electronic device and the second electronic device. The second electronic device may perform filtering so as to obtain a description and at least one function associated with each application installed in advance, and a description and at least one function associated with a currently installed application.

The second electronic device may generate a file associated with the application. A broker 933 of the second electronic device may generate, for each application, a file including a description and at least one function associated with each application installed in advance. Alternatively, the second electronic device may generate a file including a description and at least one function associated with a currently installed application. The broker 933 of the second electronic device may perform intent filtering so as to extract, from the application that has been installed in advance or is currently installed, a common function which is common to an application operating for the same purpose in a different operating system. The second electronic device may store the generated file in a platform. The second electronic device may transmit the generated file to the first electronic device via Bluetooth or Wi-Fi.

The broker 933 of the second electronic device may inform a broker 913 of the first electronic device that a communication file associated with an application is generated and a new application is added, in operation 1013. The first electronic device may store the file received from the second electronic device in a platform. The first electronic device may receive a file including information associated with an intent registered in the second electronic device in response to the installation of the application in the second electronic device. The file may be received when the second electronic device installs or updates an application, or when the second electronic device enters a communication area configured by the first electronic device. The first electronic device may store the file received from the second electronic device in the platform, such that the first application 916 and the second application 936 interoperate. Subsequently, when an application corresponding to at least one function included in the received file is executed, the first electronic device may execute data input via the executed application, using the second application 936. The operations (operations 1010, 1012, and 1013) are a process for performing application-related interoperation between the first electronic device and the second electronic device. The second electronic device transmits, to the first electronic device, a file including a description and at least one function associated with an installed application, and the first electronic device may store the received file in the platform.

When a user desires to write a message and selects the first application 916, the first electronic device may execute the first application 916 and may receive input of a message from the user. The first application 916 and the second application 936 may include various common functions for writing a message and for transmitting and receiving a written message. The common function may include various functions, such as a message transmission function, a message read function, a message download function, a message replay function, and the like. When a message is input via the first application, the first electronic device may analyze the input message via a description and at least one function which are associated with the first application and are stored in advance in the platform.

The first electronic device may transfer the input data to the broker 913 and may perform mapping in operation 1014. The first electronic device may map a description and at least one function of the first application 916 via which the message is input and a description and at least one function that are stored in advance before the message is input. Via the mapping, the first electronic device may determine the data input by the user. The broker 913 of the first electronic device may convert data input via user input, based on a file stored in advance in the platform in operation 1016.

The first electronic device 101 may inform the second electronic device of the input data in operation 1018. The first electronic device 101 may transmit the input data to the second electronic device via an XMPP. The second electronic device may apply the data received from the first electronic device to the second application 936 registered in advance. The second electronic device may map data applied to each function of the first application 916 to each function of the second application 936, so as to execute the data received from the first electronic device.

The second electronic device may execute the data from the first electronic device, via an intent registered in advance, in operation 1020. The first electronic device may execute the data using at least one function of the second electronic device. The second electronic device may execute the data received from the first electronic device 101, via the intent registered (or stored) when the second application 936 is installed. The operations (operations 1014, 1016, 1018, and 1020) use applications interoperating between the first electronic device and the second electronic device, whereby that the first electronic device transmits a message to the second electronic device, and the second electronic device may output the message transmitted from the first electronic device, via the second application 936, although an application different from the first application 916 of the first electronic device is installed in the second electronic device. The second electronic device has registered a description and at least one function associated with the second application 936 and thus, the second electronic device may be capable of executing a file received from the first electronic device although the first electronic device writes a message via an application different from the second application.

Figure 11:
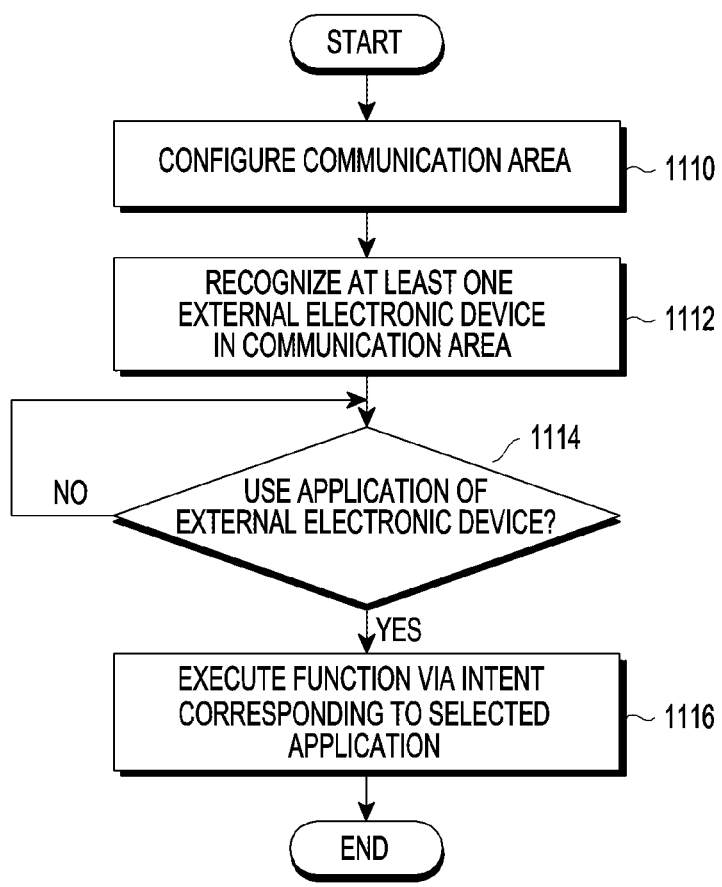
FIG. 11 is a flowchart illustrating a process of performing application-related interoperation of an electronic device according to various embodiments of the present disclosure.

FIG. 11 is a flowchart illustrating a process of performing application-related interoperation of an electronic device according to various embodiments of the present disclosure.

Hereinafter, referring to FIG. 11, a process of application-related interoperation of an electronic device according to various embodiments will be described as follows.

The electronic device 101 may configure a communication area in operation 1110. The electronic devices may perform application-related interoperation in a communication area. According to an operating system, specifications, a manufacturer, or the like, at least one application may be installed in each electronic device. The electronic device 101 may configure a communication area. The electronic device 101 may configure a communication area (e.g., a hot spot) using at least one of Wi-Fi and Bluetooth. The electronic device 101 may configure a hot spot area via a communication scheme other than Wi-Fi and Bluetooth. In the present disclosure, a hot spot area may be configured via at least one external electronic device in addition to the electronic device 101.

The electronic device 101 may recognize at least one external electronic device in the communication area in operation 1112. At least one external electronic device may enter the communication area configured by the electronic device 101, and the electronic device 101 may recognize the at least one external electronic device that enters the communication area. The communication area may be configured by the electronic device 101, or may be configured by at least one other electronic device. The external electronic device 102 may detect entry to the communication area. The external electronic device 102 may detect entry to the communication area by detecting a signal transmitted in the communication area. The external electronic device 102 may detect entry to the communication area in response to reception of a signal associated with Wi-Fi or Bluetooth. An operating system installed in the electronic device 101 may be the same as, or different from, an operating system installed in the external electronic device 102.

The electronic device 101 desires to use an application of the external electronic device in operation 1114, the electronic device 101 may perform a function via an intent corresponding to the application in operation 1116. When a user executes the application, and performs a desired function, the electronic device 101 may compare the result of execution of the function with a description of the application stored in advance in a platform. Via the comparison, the electronic device 101 may map data input by the user to the platform. For example, when the user desires to write a message and selects the first application 610, the electronic device 101 may execute the first application and receive input of a message from the user. The first application installed in the electronic device 101 and a second application installed in the external electronic device 102 may include various common functions used for writing a message and transmitting and receiving a written message. The common function may include various functions, such as a message transmission function, a message read function, a message download function, a message replay function, and the like. When a message is input via the first application, the electronic device 101 may analyze the input message via a description and at least one function which are associated with the first application and are stored in advance in the platform. The electronic device 101 may map a description of the first application that receives the input of the message and a description stored before the message is received. Via the mapping, the electronic device 101 may determine the data input by the user. The electronic device 101 may convert the data input via user input, based on a file stored in advance in the platform. The electronic device 101 may transmit the input data to the external electronic device 102.

Figure 12:
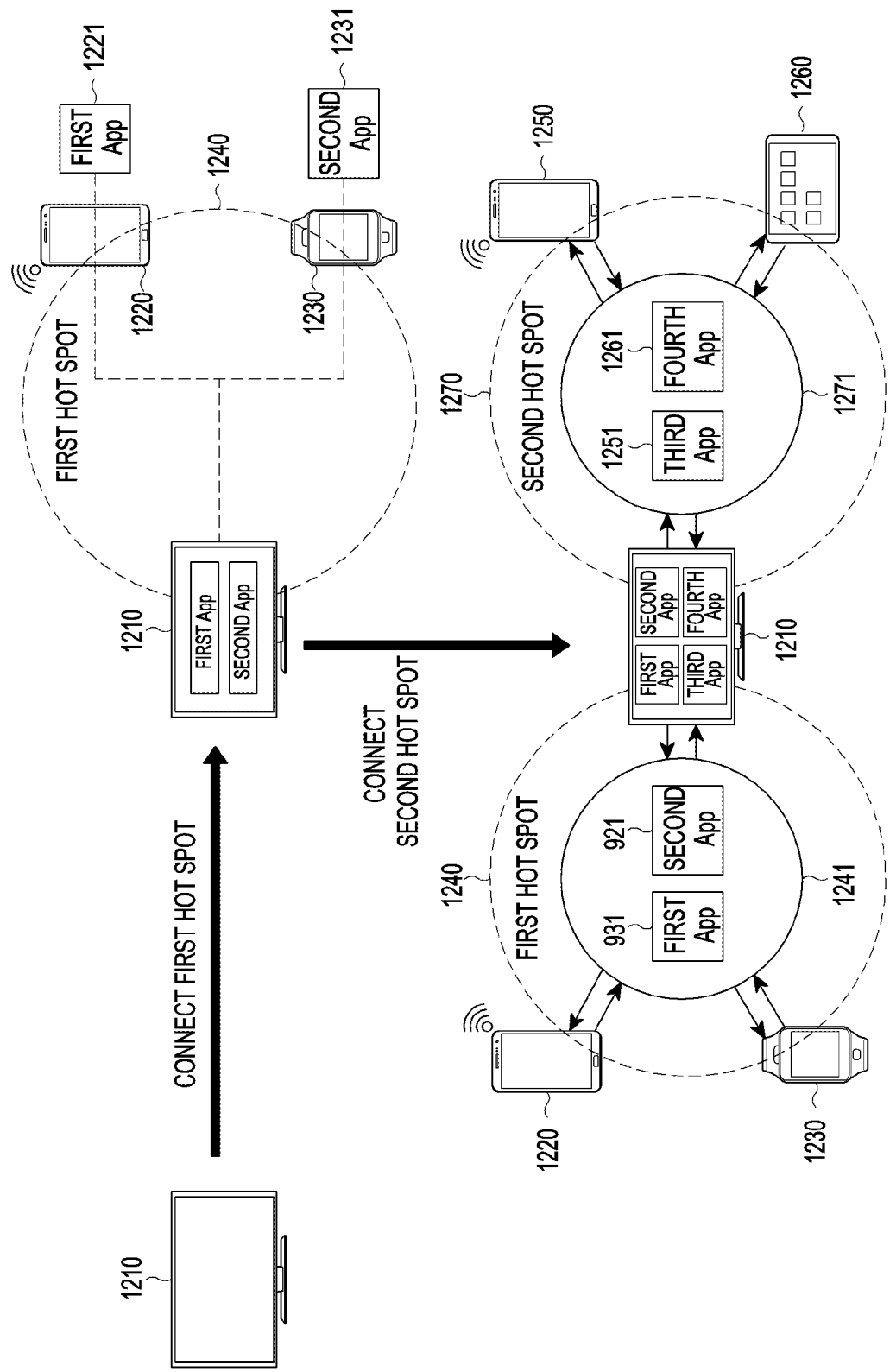
FIG. 12 is a schematic diagram illustrating a system in which a plurality of electronic devices perform application-related interoperation via a plurality of communication areas according to various embodiments of the present disclosure.

FIG. 12 is a schematic diagram illustrating a system in which a plurality of electronic devices perform application-related interoperation via a plurality of communication areas according to various embodiments of the present disclosure.

A system in which a plurality of electronic devices according to various embodiments perform application-related interoperation via a plurality of communication areas may include a first hot spot area 1240 configured by a first electronic device 1220, a second hot spot area 1270 configured by a second electronic device 1250, and a first external electronic device 1210 that performs relaying data transmitted and received between the first hot spot area 1240 and the second hot spot area 1270. In the first hot spot area 1240, the first external electronic device 1210 and a second external electronic device 1230 may exist in addition to the first electronic device 1220. In the second hot spot area 1270, the first external electronic device 1210 and a third external electronic device 1260 may exist in addition to the second electronic device 1250. A plurality of electronic devices existing in the system according to the present disclosure may perform application-related interoperation in a communication area. According to an operating system, specifications, a manufacturer, or the like, at least one application may be installed in each electronic device. The first electronic device 1220 and the second electronic device 1250 may configure communication areas 1240 and 1270, respectively. The first electronic device 1220 and the second electronic device 1250 may configure communication areas using at least one of Wi-Fi and Bluetooth. The first electronic device 1220 and the second electronic device 1250 may configure hot spot areas via a communication module other than Wi-Fi and Bluetooth. According to the present disclosure, a hot stop area may be configured via at least one of the first external electronic device 1210, the second external electronic device 1230, and the third external electronic device 1260, in addition to the first electronic device 1220 and the second electronic device 1250. The first external electronic device 1210 may exist in a plurality of hot spot areas, and may relay data transmitted and received among the plurality of hot spot areas. Also, the first external electronic device 1210 may store a file that is stored in a platform of at least one electronic device existing in each hot spot area, and may perform application-related interoperation among different hot spots using the platform.

In the state in which the first external electronic device 1210 and the second external electronic device 1230 exist in the hot spot area configured by the first electronic device 1220, the first external electronic device 1210 may exist in a hot spot area configured by the second electronic device 1250. For example, the first external electronic device 1210 existing in a hot spot area may interoperate with another electronic device that exists in the same hot spot in association with an application. Also, the first external electronic device 1210 existing in another hot spot may interoperate with another electronic device that exists in the other hot spot in association with an application.

It is assumed that a first application 1221 is installed in the first electronic device 1220, a second application is installed in the second external electronic device 1230, a third application 1251 is installed in the second electronic device, and a fourth application is installed in the third external electronic device 1260. An electronic device (e.g., the first electronic device 1220) in the first hot spot area 1240 may receive information including a description and at least one function associated with each application from a plurality of electronic devices existing in the first hot spot, and may store the same in a platform 1241. Also, an electronic device (e.g., the first electronic device 1250) in the second hot spot area 1270 may receive information including a description and at least one function associated with each application from a plurality of electronic devices existing in the second hot spot, and may store the same in a platform 1271. An electronic device (e.g., the first external electronic device 1210) that exists in both the hot spot area 1240 and the second hot spot area 1270 may integrate and store the platform 1241 of the first hot spot area 1240 and the platform 1271 of the second hot spot area 1270. For example, the first external electronic device 1210 may store a description associated with each application that performs interoperation in the first hot spot area 1240 and a description associated with each application that performs interoperation in the second hot spot area 1270.

The first external electronic device 1210 may receive and store a file associated with at least one function performed by an application of at least one electronic device 1220, 1230, 1250, and 1260 existing in each hot spot area, and records data associated with an application executed by the first external electronic device 910 in the platform, thereby performing application-related interoperation using at least one function of the at least one electronic device 1220, 1230, 1250, and 1260. As described above, the first external electronic device 1210 may store, in the platform, an intent associated with each application of each electronic device existing in each hot spot area 1240 and 1270, whereby applications of the electronic devices in each hot spot area 1240 and 1270 may interoperate.

Figure 13:
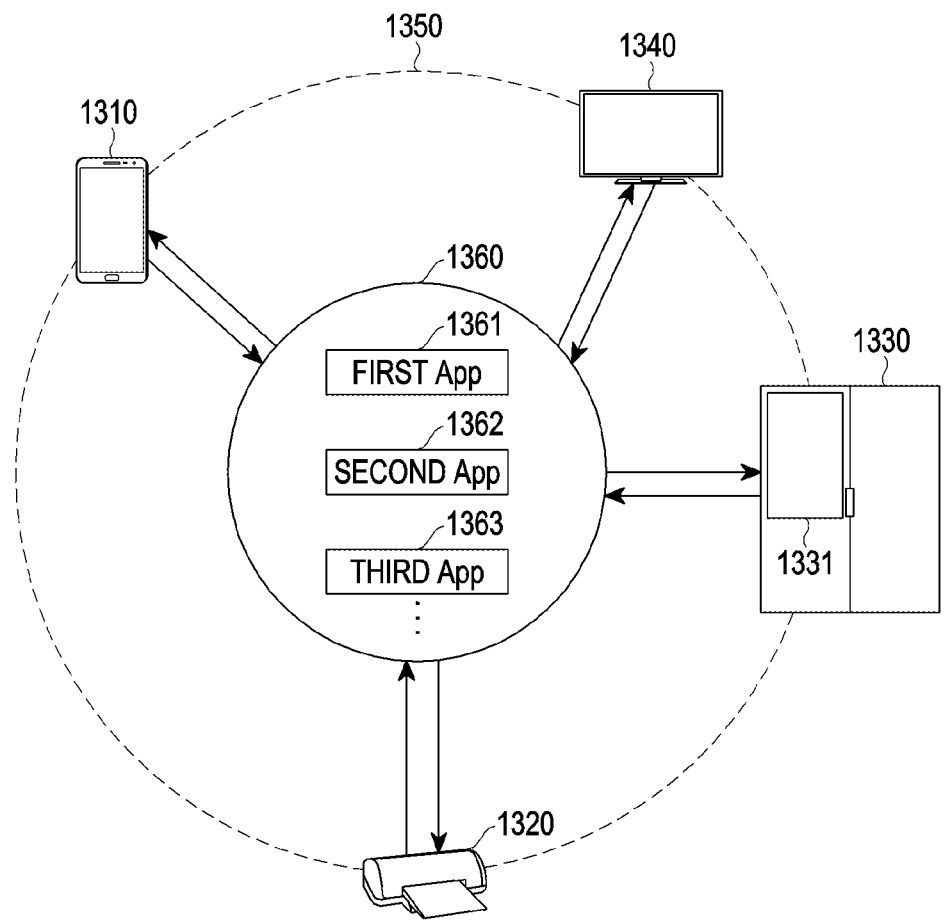
FIG. 13 is a schematic diagram illustrating a system in which a plurality of electronic devices perform application-related interoperation via a communication area according to an embodiment of the present disclosure.

FIG. 13 is a schematic diagram illustrating a system in which a plurality of electronic devices perform application-related interoperation via a communication area according to various embodiments of the present disclosure.

A system in which a plurality of electronic devices according to an embodiment of the present disclosure perform application-related interoperation via a communication area 1350 (e.g., a hot spot) may include a hot spot area 1340 configured by a first electronic device 1310, and may include a second electronic device 1320 (e.g., a printer), a third electronic device (e.g., a refrigerator) 1330, and a fourth electronic device 1310 (e.g., a TV) included in the hot spot area 1340. The first electronic device 1310 may configure a platform 1360 so that a plurality of electronic devices perform application-related interoperation using different applications. The plurality of electronic devices may perform application-related interoperation in a communication area 1350. According to an operating system, specifications, a manufacturer, or the like, at least one application may be installed in each electronic device. The first electronic device 1310 may configure a communication area using at least one of Wi-Fi and Bluetooth. Alternatively, at least one of the second electronic device 1320, the third electronic device 1330, and the fourth electronic device 1340 may configure a communication area using at least one of Wi-Fi and Bluetooth. The first electronic device 1310 may configure a hot spot area via a communication module other than Wi-Fi and Bluetooth. At least one of the first electronic device 1310, the second electronic device 1320, the third electronic device 1330, and the fourth electronic device 1340 may exist in the communication area 1350, may transmit or receive data using at least one application included in the platform 1360, and may relay transmitted or received data. Alternatively, the first external electronic device 1310 may store a file that is stored in a platform of at least one electronic device existing in each hot spot area, and may perform application-related interoperation among different hot spots using the platform.

For example, the platform 1360 may include a first application 1361 of the first electronic device 1310, a second application 1362 of the second electronic device 1320, a third application 1363 of the third electronic device 1330, and a fourth application 1364 of the fourth electronic device 1340. An electronic device (e.g., the first electronic device 1310) in the hot spot area 1350 may receive information including a description and at least one function associated with each application from a plurality of electronic devices existing in the hot spot, and may store the same in the platform 1360.

The first electronic device 1310 may receive and store a file associated with at least one function performed by an application of at least one electronic device 1320, 1330, 1340, and 1340 existing in the hot spot area, and records data associated with an application executed by the first electronic device 1310 in the platform, thereby performing application-related interoperation using at least one function of the at least one electronic device 1320, 1330, and 1340. As described above, the first electronic device 1310 may store an intent associated with each application of each electronic device existing in the hot spot area 1350 in the platform, whereby applications of the electronic devices in the hot spot area 1350 may interoperate.

When an application is installed, each electronic device 1310, 1320, 1330, and 1340 may perform intent filtering, so as to generate a file (e.g., XML) associated with the application. Each electronic device may store the generated file in the platform 1360. For example, when the second electronic device 1320 is a printer, the functions providable by the printer and the functions of applications installable in the printer may be stored in the platform 1360. In the same manner, when the third electronic device 1330 is a refrigerator, the functions providable by the refrigerator and the functions of applications installable in the refrigerator may be stored in the platform 1360. As described above, each electronic device may store the file in the platform.

For example, when a user desires to transmit a message to a contact stored in the first electronic device 1310, via the refrigerator 1330, the user may input a message that the user desires to transmit, via a display 1331 of the refrigerator 1330, and the refrigerator 1330 may transfer the input message to the first electronic device 1310 via a corresponding application of the platform 1360, and the first electronic device 1310 may transfer the received message to the corresponding contact. The refrigerator 1330 may transfer the input data to a broker of the refrigerator 1330, so as to convert the input data based on a file stored in advance in the platform. The refrigerator 1330 may inform the first electronic device 1310 of the data, and the first electronic device 1310 may transmit the data to the corresponding contact via an XMPP. As described above, although the refrigerator does not store contact information, the refrigerator is capable of transmitting a message using the contact information stored in the first electronic device 1310.

For example, when a user desires to transmit a message to a contact stored in the first electronic device 1310, via the TV 1340, the user may input a message via the TV 1340. Alternatively, when the user desires to transmit a scanned file to a contact (e.g., an e-mail), via the printer 1320, the user may scan the file via the printer 1320. As described above, when the user transmits a message via the TV 1340, or transmits a file via the printer 1320, the TV 1340 and the printer 1320 may transfer input data or scanned data to the brokers of the TV 1340 and the printer 1320, and may convert the input data or scanned data based on a file stored in advance in the platform. The TV 1340 and the printer 1320 may inform the first electronic device 1310 of the data, and the first electronic device 1310 may transmit the data to the corresponding contact via an XMPP. As described above, although the TV 1340 and the printer 1320 do not store contact information, they are capable of transmitting a message or a scanned file using the contact information stored in the first electronic device 1310.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by control circuits, the control circuits may perform a function corresponding to the command. The computer-readable storage medium may, for example, be the memory 130. At least some of the programming modules may be implemented (for example, executed) by, for example, the processor. At least some of the programming modules may include, for example, a module, a program, a routine, a set of instructions or a process for performing one or more functions.

The computer readable recoding medium includes magnetic media such include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program command, such as a Read Only Memory (ROM), a Random Access Memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

The invention claimed is:

1. A method of performing application-related interoperation by an electronic device, the method comprising:
   receiving, from an external electronic device, a service description of a first function of a first application to be executed at the external electronic device;
   identifying, based on the service description, a second function of a second application to be executed at the electronic device, wherein the first function and the second function are common functions;
   receiving data associated with the second function being executed by the electronic device;
   converting the received data based on the service description;
   converting the data from a second format to be processed by the second application to a first format to be processed by the first application of the external electronic device;
   transmitting the data to the external electronic device to control the external electronic device to process the data through execution of the first function;
   requesting, from the external electronic device, information for performing application-related interoperation between the electronic device and the external electronic device in response to configuration of a communication area by the electronic device;
   wherein the receiving of the service description comprises receiving service descriptions of each application of the external electronic device from the external electronic device, in response to the requesting; and
   mapping functions of each application installed on the electronic device to functions of each application installed on the external electronic device based on the service description.

2. The method of claim 1, further comprising:
   displaying an execution result of processing the data.

3. The method of claim 1, wherein the converting comprises:
   converting the data based on an extensible messaging and presence protocol (XMPP).

4. The method of claim 1, wherein the received service description comprises information associated with an intent that is registered in the external electronic device in response to installation of the first application in the external electronic device.

5. The method of claim 1, wherein the receiving of the service description comprises receiving the service description when the external electronic device installs or updates an application, or when the external electronic device enters a communication area configured by the electronic device.

6. The method of claim 1, wherein an operating system installed in the electronic device is different from an operating system installed in the external electronic device.

7. The method of claim 1, further comprising:
configuring a communication area by the electronic device;
receiving authentication information from the external electronic device that enters the configured communication area; and
authenticating the external electronic device based on the received authentication information.

8. The method of claim 7, further comprising:
configuring a platform for storing the received service description,
wherein the platform includes a service description associated with at least one function for each application performed by at least one external electronic device which enters or exists in the communication area.

9. The method of claim 1, further comprising:
when an application of the electronic device is installed, registering an intent of the application.

10. The method of claim 9, wherein the intent includes at least one function that is applied in common to applications executed in different operating systems for a same purpose.

11. An electronic device for performing application-related interoperation, the electronic device comprising:
a communication module; and
a processor configured to:
control the communication module to receive, from an external electronic device, a service description of a first function of a first application to be executed at the external electronic device,
identify, based on the service description, a second function of a second application to be executed at the electronic device, wherein the first function and the second function are common functions,
receive data associated with the second function being executed by the electronic device,
convert the received data based on the service description,
convert the data from a second format to be processed by the second application to a first format to be processed by the first application,
transmit the data to the external electronic device to control the external electronic device to process the data through execution of the first function;
request, from the external electronic device, information for performing application-related interoperation between the electronic device and the external electronic device in response to configuration of a communication area by the electronic device;
wherein to receive the service description comprises to receive service descriptions of each application of the external electronic device from the external electronic device, in response to the request; and
map functions of each application installed on the electronic device to functions of each application installed on the external electronic device based on the service description.

* * * * *